United States Patent
Valencia, Jr. et al.

(10) Patent No.: US 10,230,140 B2
(45) Date of Patent: Mar. 12, 2019

(54) VEHICLE BATTERY COOLING SYSTEM

(71) Applicant: GM GLOBAL TECHNOLOGY OPERATIONS LLC, Detroit, MI (US)

(72) Inventors: Pablo Valencia, Jr., Northville, MI (US); Chih-cheng Hsu, Bloomfield Township, MI (US); Alexander M Bilinski, Avoca, MI (US); Roger M Brisbane, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 15/277,942

(22) Filed: Sep. 27, 2016

(65) Prior Publication Data

US 2018/0090798 A1   Mar. 29, 2018

(51) Int. Cl.
| | |
|---|---|
| *H01M 10/653* | (2014.01) |
| *H01M 10/613* | (2014.01) |
| *H01M 10/625* | (2014.01) |
| *H01M 10/6567* | (2014.01) |
| *H01M 2/10* | (2006.01) |
| *H01M 2/20* | (2006.01) |
| *H01M 10/6553* | (2014.01) |
| *H01M 10/6556* | (2014.01) |

(52) U.S. Cl.
CPC ....... *H01M 10/653* (2015.04); *H01M 2/1077* (2013.01); *H01M 2/206* (2013.01); *H01M 10/613* (2015.04); *H01M 10/625* (2015.04); *H01M 10/6553* (2015.04); *H01M 10/6556* (2015.04); *H01M 10/6567* (2015.04); *H01M 2220/20* (2013.01)

(58) Field of Classification Search
CPC ............ H01M 10/653; H01M 10/613; H01M 10/625; H01M 10/6567; H01M 2/10; H01M 2/1077; H01M 2/20; H01M 2/206
See application file for complete search history.

(56) References Cited

U.S. PATENT DOCUMENTS

| | | |
|---|---|---|
| 8,231,996 B2 | 7/2012 | Howard et al. |
| 9,196,935 B2 | 11/2015 | Han et al. |
| 2011/0020694 A1 | 1/2011 | Khakhalev et al. |
| 2013/0196211 A1 | 8/2013 | Park et al. |
| 2016/0351977 A1* | 12/2016 | Dudley ................ H01M 2/021 |

* cited by examiner

*Primary Examiner* — Karie O'Neill Apicella

(57) ABSTRACT

A cooling system for a battery is provided which includes a first tube, a second tube and a middle section which may be formed from an electrically insulating yet thermally conductive material. The first tube and the second tube may each be adapted to transfer coolant from a first end to a second end. The middle section integral may be the first tube on the first side of the middle section and integral to the second tube on the second side of the middle section. The first tube, the second tube and the middle section may be operatively configured to draw thermal energy away from at least one bus bar and corresponding cell tabs for a battery.

5 Claims, 4 Drawing Sheets

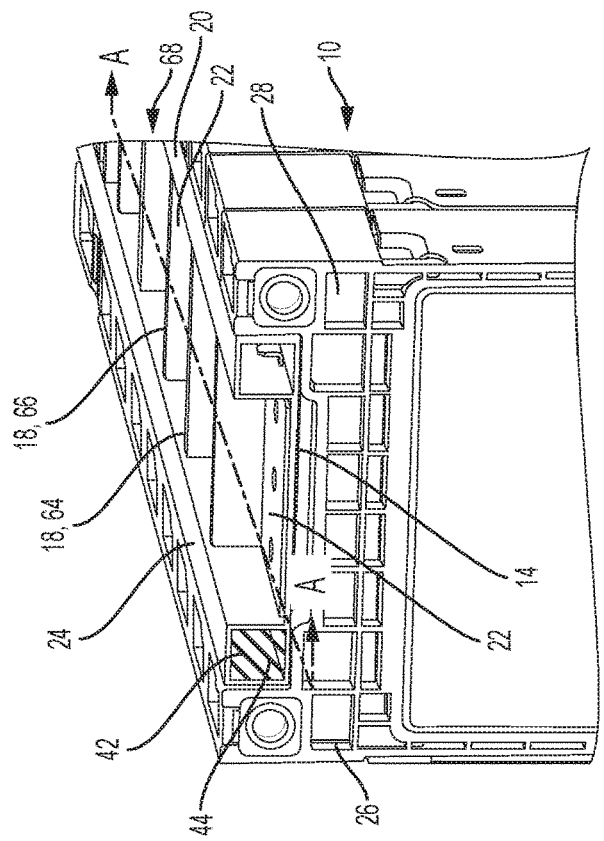
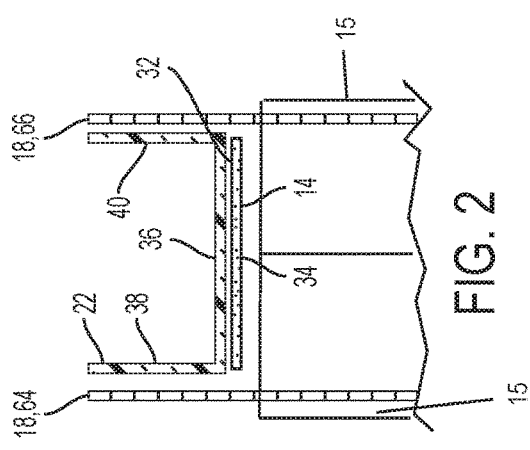
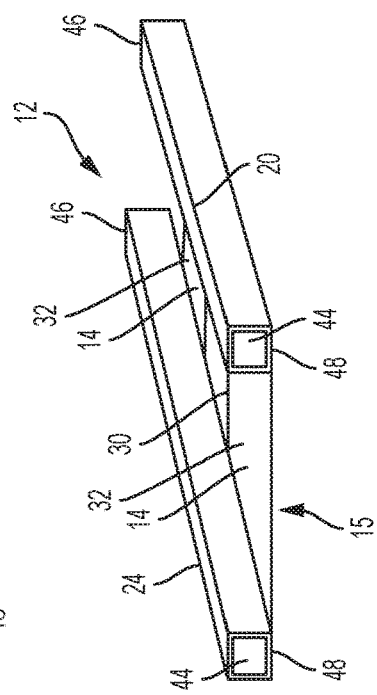

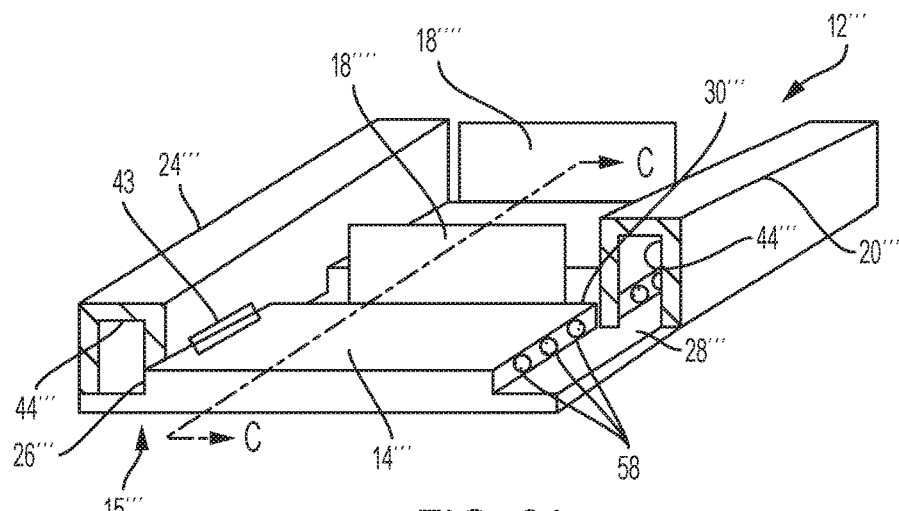
FIG. 6A
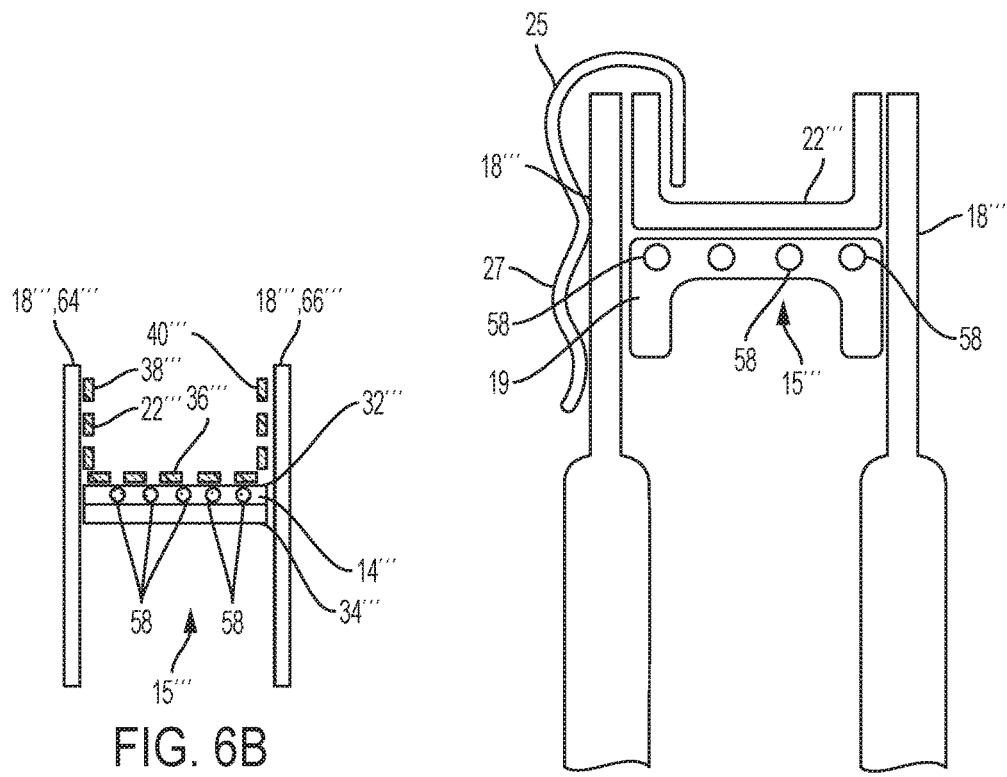
FIG. 6B
FIG. 6C

VEHICLE BATTERY COOLING SYSTEM

TECHNICAL FIELD

The present disclosure relates to vehicle batteries, and more particularly, a cooling system for a vehicle battery system.

BACKGROUND

Large capacity rechargeable batteries are currently being investigated for use in electric vehicles. The ultimate feasibility of electric vehicles depends on significantly reducing the associated costs. Reduction in the costs of battery assemblies is particularly important in this regard.

Lithium ion batteries are an important type of battery technology. Most battery assemblies, including lithium ion battery assemblies, include a plurality of individual electrochemical cells. Typically, such electrochemical cells include an anode, a cathode, and a separator positioned between the anode and cathode. Typically, the anode includes a metal sheet or foil (usually copper metal) over-coated with a graphitic layer. Similarly, the cathode usually includes a metal sheet or foil (usually aluminum metal) over-coated with a lithium-containing layer. Finally, electrochemical cells include an electrolyte which is interposed between the anode and the cathode. Terminals allow the generated electricity to be used in an external circuit. Electrochemical cells produce electricity via an electrochemical reaction.

For high power application, a plurality of battery cells are utilized and assembled into a battery module. Moreover, such battery modules can include a plurality of metallic (e.g., copper and/or aluminum) cooling fins interspersed between battery cells in a parallel wired battery cell pair. Compression foam pads are typically interspersed between some battery pairs. It turns out that such battery modules typically exhibit temperature differences between the battery cells. Such temperature differences lead to a reduction in battery module performance with a decrease in battery lifetime. Although the prior art cooling fins work reasonably well in cooling the battery cells, improvements are still desirable.

Accordingly, there is a need for improved battery module assemblies and a cooling system to be used therein.

SUMMARY

The present disclosure provides a cooling system for a battery according to various embodiments. The cooling system may include a first tube, a second tube and a middle section which may be formed from thermally conductive polymer material. The first tube and the second tube may each be adapted to transfer coolant from a first end to a second end. The middle section may be integral to the first tube on the first side of the middle section and integral to the second tube on the second side of the middle section. The first tube, the second tube and the middle section may be operatively configured to draw thermal energy away from at least one bus bar and corresponding cell tabs for a battery.

The present disclosure further provides a battery having a cooling system wherein the battery includes a battery housing, plurality of battery cells disposed within the housing and a curved cooling tube. Each battery cell in the plurality of battery cells includes a pair of cell tabs interconnected to an adjacent pair of cell tabs from a neighboring battery cell via a corresponding bus bar. The curved cooling tube may be adapted to transfer coolant from a first end of the cooling tube to a second end of the cooling tube. It is understood that curved cooling tube may be longitudinally disposed in part above the battery cells and longitudinally disposed in part under each bus bar.

The invention and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description of preferred embodiments, and best mode, appended claims, and accompanying drawings in which:

FIG. 1 shows a plurality of battery cells in a battery having a first embodiment of the cooling system of the present disclosure.

FIG. 2 illustrates a schematic partial cross-section of the battery along lines A-A in FIG. 1.

FIG. 3 illustrates a partial view of the cooling system bracket of the first embodiment shown in FIG. 1.

FIG. 6A is an isometric schematic view of a third embodiment of the cooling system of the present disclosure.

FIG. 6B is a partial schematic view of a cross section of the third embodiment of the cooling system along lines C-C in FIG. 6A.

FIG. 6C is a partial schematic view of another cross section of the cooling system in accordance with third embodiment of the cooling system.

Like reference numerals refer to like parts throughout the description of several views of the drawings.

DETAILED DESCRIPTION

Figure 5:
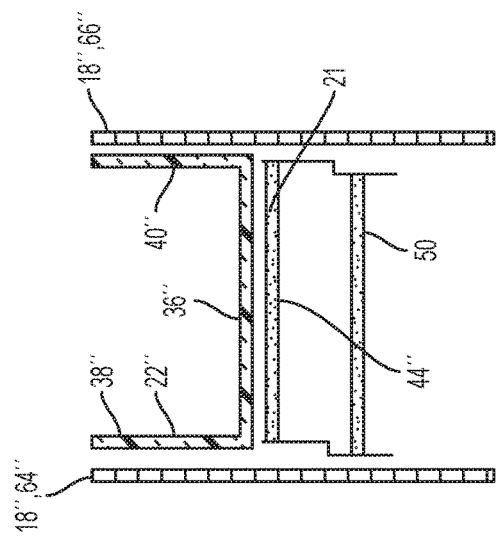
FIG. 5 illustrates a schematic, partial cross-section of the second embodiment of the cooling system along lines B-B in FIG. 4.

The exemplary embodiments described herein provide detail for illustrative purposes, and are subject to many variations in composition, structure, and design. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein are for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items.

The present disclosure provides a cooling system 12 for a battery 10. With reference to FIGS. 1-3, a battery 10 is shown having cell tabs 18 and cell-to-cell bus-bars 22. The battery cell tab (or tab electrode) 18 is an extension of a battery cell electrode which extends above the cell 15 as shown in FIGS. 1-2. The cell tabs 18 (shown in FIGS. 1 and 2) and cell-to-cell bus-bars 22 tend to have the most concentrated heat production as the battery system 10 operates. Additionally, it is understood that the cell tabs 18 and cell-to-cell bus-bars 18 have the least resistance thermal pass into the cell-core. So cell tabs 18 and cell-to-cell bus-bars present the best area in a battery to effectively manage thermal energy.

Figure 7B:
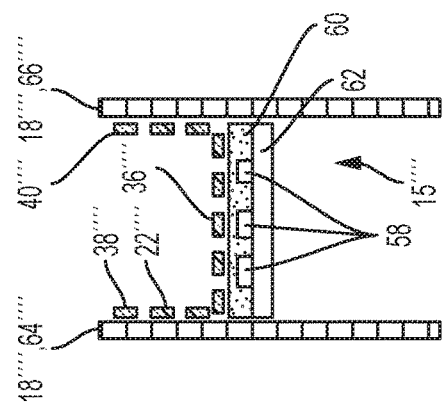
FIG. 7B is a partial schematic view of a cross section of the third embodiment of the cooling system along lines D-D in FIG. 7A.

In order to increase the lifetime and effectiveness of a battery 10, the present disclosure provides a cooling system 12 to reduce the temperature and temperature differences among the different areas of the batteries. Given that the cell tabs 18 and the cell-to-cell bus bars 22 generate the most heat, it is desirable to remove heat from these battery components via the cooling system 12 of the present disclosure. With reference again to FIGS. 1-3, a first embodiment of the cooling system 12 of the present disclosure is shown where cell tabs 18 are shown above each battery cell and bus bars 22 connect each cell tab. The cooling system 12 includes a first tube 24 proximate to the first lateral side 26 of the battery 10 and a second tube 20 proximate to the second lateral side 28 of the battery 10. The cooling system 12 of the present disclosure directly contacts the battery bus bars 22 in order to dissipate heat from the battery bus-bars and the cell tabs 18 as described in the first embodiment herein. Moreover, the cooling system 12 of the present disclosure may be made in part, or in whole, by thermally conductive polymer material similar to CoolPoly made by Celanese. It should also be noted that cell tabs 64, 66 of FIG. 2 and their counterparts in FIGS. 5, 6B and 7B are understood to have at least one adjacent pair of cell tabs 68 (shown in FIG. 1) for the purpose of this non-limiting example disclosure.

The first and second tubes 24, 20 may be integral to one another via a middle section 15 as shown in FIGS. 2 and 3. The middle section 15 may include an opening 30 to accommodate the cell tabs 18. It is understood that a plurality of openings 30 may be implemented in accordance with the number of battery cell tabs 18 used in the battery 10. As shown in FIG. 3, a schematic, partial isometric view of the cooling system 12 according to the first embodiment is illustrated where the middle section 15 is formed from a plurality of middle strips 14. The first tube 24 may be integral to a first side of each middle strip 14 while the second tube 20 may be integral to a second side of each middle strip 14. In order to provide a unitary cooling system 12, the first tube 24, second tube 20 and middle section 15 may be formed via an injection molding process. Alternatively, where the first and second tubes 24, 20 are formed from a material which is different from the middle section 15, the middle section 15 may be injection molded onto the tubes—optionally, but not necessarily through a two shot injection molding process. With reference to the cross section of the cooling system 12 shown in FIG. 2, each middle strip 14 of the cooling system 12 has an upper face 32 and a lower face 34 (shown in FIG. 2). The upper face 32 of each middle strip 14 is adjacent to a base area 36 for each bus bar 22. The bus bars 22 of FIGS. 1-3 include a front portion 38, a base area 36, and an end portion 40. As shown in FIGS. 1 and 2, the front portion 38 and end portion 40 for each bus bar 22 are substantially vertical and are adjacent to a corresponding cell tab while the middle area for each bus bar 22 is adjacent to an upper face 32 of a middle strip 14 of the cooling system 12. Front portion 38 is adjacent to corresponding first cell tab 64 while end portion 40 is adjacent to corresponding second cell tab 66. The front portion 38 may be affixed to first cell tab 64 via a weld (such as ultrasonic welding or laser welding). Similarly, the end portion 40 may be affixed to the second cell tab 66 via a weld (such as ultrasonic welding or laser welding). It is further understood that the base area 36 of bus bar 22 may, but not necessarily, be affixed to the middle strip 14 via a thermal glue. This arrangement allows for heat in the cell tab and bus bar 22 to transfer to the middle section 15 via thermal conduction.

Accordingly, in light of the arrangement between the cooling system 12, the bus bar 22 and the cell tab, thermal energy may be conducted away from the cell tabs 18 and the bus bar 22 as heat from the cell tabs 18 and bus bar 22 transfers to the middle strip 14 of the cooling system 12. As shown in FIGS. 1-3, the first and second tubes 24, 20 may be integral to the middle section 15 and therefore, the coolant 42 (shown schematically as element 42 in FIG. 1) which flows through the tube chambers 44, 46 may help transfer heat away from the middle section 15 and the first and second tubes 24, 20. It is understood that, in the first embodiment shown in FIGS. 1-3 coolant 42 may enter the cooling system 12 via a first end 46 of any one of the first and/or second tube 24, 20 and the coolant 42 may exit the second end 48 of any one of the first and/or second tubes 24, 20. A hose or other liquid passage device (now shown) may be attached to any one or more of the first and/or second ends 46, 48 of the first and second tubes 24, 20 to transfer coolant 42 into and out of the cooling system 12. The coolant 42 used in the first and second tubes 24, 20 may be coolant 42 which is used in other parts of the battery 10/engine or may be coolant 42 which is dedicated to this particular cooling system 12.

Given that the middle section 15 of the cooling system 12 serves to draw heat away from the bus bars 22 and the cell tabs 18, the middle section 15 may be formed from a thermally conductive polymeric material such as a CoolPoly thermally conductive plastic which is manufactured by Celanese. The thermally conductive polymeric material for the cooling system 12 provides the benefit in that the material enables the cooling system to be electrically insulated thereby preventing a short circuit situation. However, the same material allows for thermal energy to be easily transferred.

Unlike conventional plastics which are considered thermal insulators, the thermal conductivity of CoolPoly D-series plastics range from 1.0 W/mK to 10 W/mK while maintaining the electrical insulation. This exceptional level of thermal conductivity in a plastic is 5 to 100 times the value of conventional plastics. The optimal level of thermal conductivity for any application depends on the power input, size of the part and the convection conditions. Therefore, CoolPoly D-Series combines thermal conductivity and electrical insulation in standard pellet form suitable for thermoplastic injection molding and other processes (e.g. extrusion).

Accordingly, it is understood that the entire cooling system 12 shown in FIGS. 1-3 may be made from a material such as CoolPoly or the middle section 15 may be the only area formed by CoolPoly such that the middle section 15 is injection molded onto the first and second tubes 24, 20. The first and second tubes 24, 20 may therefore be made from different material such as, but not limited to aluminum. Accordingly, as shown in FIGS. 1-3, the first embodiment of the cooling system 12 of the present disclosure attaches to the battery bus-bars and tab components as shown in FIGS. 1 and 3 to enhance the heat transfer effectiveness by transferring thermal energy away from the cell tabs and bus-bars into the middle section 15, first and second tubes 24, 20 and coolant 42. Moreover, the cooling system of the present disclosure also provides packaging efficiency in the battery environment.

Figure 4:
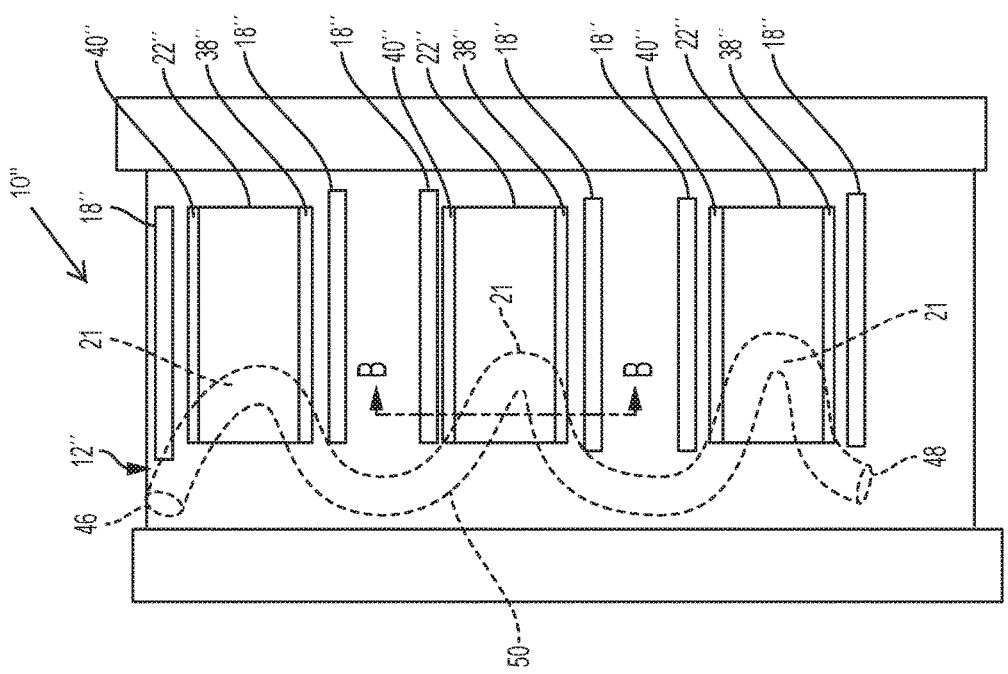
FIG. 4 illustrates a plan view of a second embodiment of the cooling system of the present disclosure.

Referring now to FIGS. 4 and 5 of the present disclosure, a second embodiment of the cooling system 12 is shown. FIG. 4 illustrates a plan view of the second embodiment of the cooling system 12 of the present disclosure while FIG. 5 illustrates a schematic, partial cross-section of the second embodiment of the cooling system 12 along lines B-B in FIG. 4. As shown in FIGS. 4 and 5, the cooling system 12 according to the second embodiment is limited to a curved tube 50 having an inner chamber 44" which is adapted to allow coolant 42 (shown in FIG. 1) to pass through the curved tube 50 so that the curved tube 50 may thermally conduct heat away from the base area 36" of each bus bar 22" and the cell tabs 18" which are also in close proximity to the curved tube 50. The curved tube 50 shown in FIGS. 4 and 5 may also be formed from a material such as CoolPoly.

Referring now to FIG. 5, the cross-sectional view of the second embodiment in FIG. 4 is shown along line B-B demonstrating that the curved tube 50 is disposed just below and adjacent to the base area 36" of each bus bar 22". The curved tube 50 may, but not necessarily, be attached to the base area 36" of each bus bar 22" via a thermal glue. Given that the curved tube 50 changes configuration, the curved tube 50 is adapted to receive and expel coolant 42 (shown in FIG. 1) via first end 46" and second end 48" while also able to transfer heat away from the base area 36" of each bus bar 22" and proximate cell tab 18" given that the tube curves into area just below each bus bar 22" as shown in FIG. 5. As shown in FIG. 5, cell tabs 18" are adjacent to the front portion 38" and end portion 40" for each bus bar 22". Accordingly, as cell tabs 18" and bus bars 22" heat up, the curved tube 50 with coolant 42 which travels through the curved tube 50 is operatively configured to draw heat away from the cell tabs 18" and bus bars 22" via conduction and convection.

With reference now to FIGS. 6A and 6B, a third embodiment of the cooling system 12''' of the present disclosure is illustrated. FIG. 6A is an isometric schematic view of the third embodiment of the cooling system 12 in battery 10" while FIG. 6B is a partial schematic view of a cross section of the third embodiment cooling system 12 along lines C-C in FIG. 6A. In FIG. 6A, the cell tabs 18''' are shown disposed in the openings 30''' of middle section 15'''. The openings 30''' defined in middle section 15''' are adapted to receive cell tabs 18''' as shown. It is to be understood that cell tabs 18''' are schematically shown as dashed lines to denote where the cell tabs 18''' are disposed relative to the middle section 15'''. The entire cell tab 18''' structure is not shown so that the configuration of the middle section 15''' of the cooling system 12''' may be shown. Nonetheless, it is understood that the cell tabs 18''' project in an upward fashion as shown in FIG. 6B and FIG. 1. Similar to the first embodiment, cell tabs 18''' are understood to extend above each battery cell and bus bars 22''' connect each cell tab 18''' similar to that in FIG. 1. The cooling system 12 includes a first tube 24''' proximate to the first lateral side 26''' of the battery and a second tube 20''' proximate to the second lateral side 28''' of the battery. The cooling system 12''' of the present disclosure directly contacts the battery bus-bars and is coupled to the cell tabs 18''' via the battery bus bars 22''' in order to dissipate heat from the battery bus-bars and the cell tabs 18'''. Moreover, similar to the first embodiment, the cooling system 12''' according to the third embodiment may be made in part, or in whole, by thermally conductive polymer material similar to CoolPoly made by Celanese.

Referring to FIGS. 6A-6C collectively, the first and second tubes 24''', 20''' of the third embodiment may be integral to one another via a middle section 15''' as shown in FIG. 6A. The middle section 15''' may include openings 30''' to accommodate the cell tabs 18'''. As shown in FIG. 6A, a schematic isometric view of the cooling system 12''' according to the first embodiment is illustrated where the middle section 15''' is formed from a plurality of middle strips 14''''. Unlike the first embodiment where the first tube 24''' may be integral to a first lateral side of each middle strip 14''' while the second tube 20''' may be integral to a second lateral side of each middle strip 14''', the third embodiment provides a middle section 15''' which defines a plurality of cooling channels 58 which extend from the first tube 24''' to the second tube 20''' as shown in FIGS. 6A and 6B. As shown in FIG. 6A, the first tube 24''' and second tube 20''' may be assembled onto the middle section 15''' with an adhesive 42 (shown as an example schematic in FIG. 6A) so that the components are securely affixed to one another and so that coolant 42 will not leak between the components. It is also understood, the first and second tubes 24''', 20''' may, but not necessarily, be formed from a material which is different from the middle section 15'''. For example, the first and second tubes 24''', 20''' may be formed from aluminum while the middle section 15''' may be formed from the thermally conductive polymer CoolPoly.

With reference to the cross section of the cooling system 12''' shown in FIG. 6B, each middle strip 14''' of the cooling system 12''' has an upper face 32''' and a lower face 34'''. The upper face 32''' of each middle strip 14''' is adjacent to a base area 36''' for each bus bar 22'''. The bus bars 22''' of the third embodiment similarly include a front portion 38''', a base area 36''' and an end portion 40'''. As shown in FIG. 6B, the front portion 38''' and end portion 40''' for each bus bar 22''' are substantially vertical and are adjacent to a corresponding cell tab 18''' while the base area 36''' for each bus bar 22''' is adjacent to an upper face 32''' of a middle strip 14 of the cooling system 12'''. The front portion 38''' may be affixed to first cell tab 64''' via a weld (such as ultrasonic welding or laser welding). Similarly, the end portion 40''' may be affixed to the second cell tab 66''' via a weld (such as ultrasonic welding or laser welding). It is further understood that the base area 36''' of bus bar 22''' may, but not necessarily, be affixed to the middle strip 14''' via a thermal glue. This arrangement allows for heat in the cell tab 18''' and bus bar 22''' to transfer thermal energy to the middle section 15''' via conduction. Given that the middle section 15''' allows coolant 42''' to pass through the middle section 15''' via the cooling channels 58, the middle section 15''' may effectively draw thermal energy away from the bus bars 22''' and the cell tabs 18''' as the coolant 42 flows through the cooling channels 58 of the middle section 15'''.

It is understood that, in the third embodiment shown in FIGS. 6A-6B, coolant 42 may enter the cooling system 12''' via a first end 46''' of any one of the first and/or second tube 24''', 20''' and the coolant 42 may exit any other end of the first and/or second tubes 24''', 20'''. A hose or other liquid passage device (now shown) may be attached to any one or more of the first and/or second ends 46''', 48''' of the first and second tubes 24''', 20''' to transfer coolant 42 into and out of the cooling system 12'''. The coolant 42 used in the first and second tubes 24''', 20''' may be coolant 42 which is circulated in other parts of the battery or engine. Alternatively, similar to previous embodiments, the coolant 42 in the cooling channels 58 and first and second tubes 24''', 20''' of the third embodiment may be dedicated to this particular cooling system 12'''. It is understood that the coolant (shown as 42 in FIG. 1) may be one of a variety of fluids such as, but not limited to pure water or a 50-50 mixture of water and glycol as non-limiting examples.

With reference to FIG. 6C, it is understood that the middle section 15''' of the third embodiment may include an elongated lateral side 19 at each side of middle section 15''' which is adjacent to cell tabs 18''' as shown. This configuration allows for thermal energy to transfer directly from the cell tabs 18''' to the middle section 15''' of cooling system 12'''. Moreover, an optional clip 25 may be added to a cell tab 18''' and bus bar 22''' (as shown in the non-limiting example of FIG. 6C). Optional clip 25 may include a distal end 27 which biases the clip 25 and cell tab 18''' so that the cell tab 18''' abuts the lateral side of middle section 15'''. It is understood that the arrangement shown in FIG. 6C is a non-limiting example and that clip 25 may be used on every cell tab 18'''.

Figure 7A:
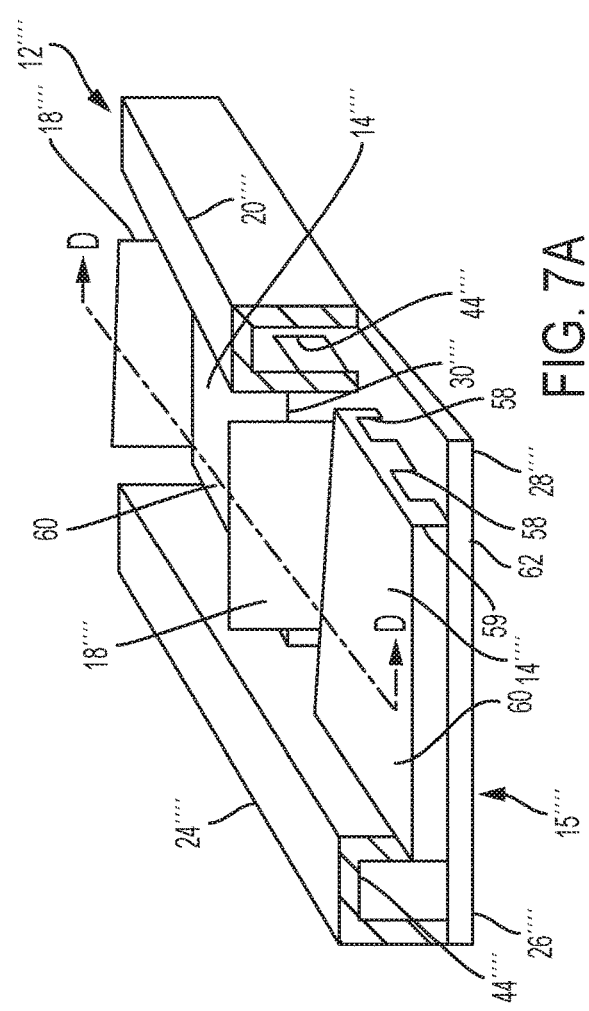
FIG. 7A is an isometric schematic view of a third embodiment of the cooling system of the present disclosure.

Referring now to FIGS. 7A and 7B, the cooling system 12'''' according to a fourth embodiment is shown where the cooling system 12'''' is formed from four different parts: (1) first tube 24''''; (2) middle base 62, (3) second tube 20''''; and (4) middle cover(s) 60. It is understood that, an alternative arrangement for the fourth embodiment may allow for the first tube 24'''', the second tube 20'''' and the middle base 62 to be integral to one another thereby forming a unitary piece. Such a unitary construction may be achieved via an injection molding process or the like. The integral, unitary piece may then be adapted to receive at least one middle cover 60. As shown in FIGS. 7A and 7B, middle cover 60 defines apertures 58'''' to an inner cavity or recess 59 of the middle cover 60 at the first lateral side 26 and the second lateral side 28 of the middle cover 60. The openings 30 on each side of the middle cover 60, the inner recess/cavity 59 of the middle cover 60, the first tube 24'''' and the second tube 20'''' are all in fluid communication with one another such that coolant 42 (which flows through the apertures 58'''' in the cover) may flow between the various components to carry away excessive thermal energy from the middle cover 60, the bus bar 22'''' and the cell tabs 18''''. Similar to the construction in the aforementioned third embodiment, the various components of the fourth embodiment may be affixed to one another using an adhesive. Adhesives (shown as 43 in FIG. 6A) are particularly useful in this application to prevent potential leakage of coolant 42 between components. Again, as shown in FIG. 7B, the cell tabs 18'''' are adjacent to the bus bar 22'''' while the bus bar 22'''' is adjacent to the base area 36'''' of the middle cover 60''''. Therefore, thermal energy is conducted through these components so that temperatures in the cell tabs 18'''' and the bus bars 22'''' are reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cooling system for a battery comprising:
    a first tube adapted to transfer coolant;
    a second tube adapted to transfer coolant; and
    a middle section integral to the first tube on the first side of the middle section and integral to the second tube on the second side of the middle section, the middle section defines a plurality of openings and is disposed adjacent to only one side of a battery cell
    wherein each opening in the plurality of openings is operatively configured to accommodate a pair of cell tabs from the battery cell so that the first tube and the second tube are both disposed perpendicular to each pair of cell tabs extending out of each opening.

2. The cooling system as defined in claim 1 wherein the middle section is formed from an electrically insulating yet thermally conductive material which is injection molded onto the first and second tubes.

3. The cooling system as defined in claim 2 wherein the first tube and the second tube are formed from aluminum.

4. The cooling system as defined in claim 2 wherein the first tube and the second tube are each adapted to receive coolant at a first end.

5. The cooling system as defined in claim 4 wherein the first tube and the second tube are each adapted to purge coolant at a second end.

* * * * *